United States Patent [19]

Takise et al.

[11] Patent Number: 5,353,222
[45] Date of Patent: Oct. 4, 1994

[54] DOCUMENT PROCESSING APPARATUS FOR CORRECTING ADDRESS AND FORMAT INFORMATION OF DOCUMENT INFORMATION UP TO A DESIGNATED PAGE

[75] Inventors: Kikuo Takise, Tokyo; Hiroshi Takakura, Yokohama; Takahiro Kato, Tokyo; Yukari Shibuya, Kawasaki; Masaki Hamada, Tokyo, all of Japan

[73] Assignee: Canon Kabushiki Kaisha, Tokyo, Japan

[21] Appl. No.: 26,205

[22] Filed: Mar. 2, 1993

Related U.S. Application Data

[63] Continuation of Ser. No. 344,518, Apr. 24, 1989, abandoned, which is a continuation of Ser. No. 935,382, Nov. 26, 1986, abandoned.

[30] Foreign Application Priority Data

Nov. 28, 1985 [JP]  Japan ................... 60-267920
Jan. 31, 1986 [JP]  Japan ................... 61-20524

[51] Int. Cl.⁵ ............................................ G06F 3/14
[52] U.S. Cl. .................................. 364/419.17; 395/148; 400/63; 364/943.4; 364/943.1
[58] Field of Search ............... 364/200, 900, 419.17; 340/723, 745; 358/280, 287, 450; 395/148; 345/112; 400/63, 76

[56] References Cited

U.S. PATENT DOCUMENTS

| | | | |
|---|---|---|---|
| 4,051,459 | 9/1977 | Steranko et al. | 364/900 |
| 4,086,660 | 4/1978 | McBride | 364/900 |
| 4,357,680 | 11/1982 | Greek, Jr. et al. | 364/900 |
| 4,425,629 | 1/1984 | Cason et al. | 364/900 |
| 4,503,515 | 3/1985 | Cuan et al. | 364/900 |
| 4,506,343 | 3/1985 | Shipp, Jr. et al. | 364/900 |
| 4,513,391 | 4/1985 | Maddock | 364/900 |
| 4,538,183 | 8/1985 | Kanno et al. | 358/452 |
| 4,539,653 | 9/1985 | Bartlett et al. | 364/900 |
| 4,571,700 | 2/1986 | Emry, Jr. et al. | 364/900 |
| 4,575,813 | 3/1986 | Bartlett et al. | 364/900 |
| 4,580,171 | 4/1986 | Arimoto | 358/451 |
| 4,587,631 | 5/1986 | Nielsen et al. | 364/900 |
| 4,608,662 | 8/1986 | Watanabe et al. | 364/900 |
| 4,608,664 | 8/1986 | Bartlett et al. | 364/900 |
| 4,633,430 | 12/1986 | Cooper | 364/900 |
| 4,642,792 | 2/1987 | Clements et al. | 364/900 |
| 4,648,047 | 3/1987 | Berkland et al. | 364/900 |
| 4,648,071 | 3/1987 | Repass et al. | 364/900 |
| 4,649,513 | 3/1987 | Martin et al. | 364/900 |
| 4,655,622 | 4/1987 | Aoki | 400/121 |
| 4,656,602 | 4/1987 | Berkland et al. | 364/900 |
| 4,667,248 | 5/1987 | Kanno | 358/452 |
| 4,686,649 | 8/1987 | Rush et al. | 364/200 |
| 4,713,754 | 12/1987 | Agarwal et al. | 364/200 |
| 4,783,760 | 11/1988 | Carosso | 364/900 |
| 4,792,919 | 12/1988 | Fukunaga | 364/900 |
| 4,959,769 | 9/1990 | Cooper et al. | 364/200 |

FOREIGN PATENT DOCUMENTS

| | | |
|---|---|---|
| 121165 | 6/1986 | Japan . |
| 59243916 | 6/1986 | Japan . |
| 267165 | 11/1986 | Japan . |

OTHER PUBLICATIONS

English Abstract for Japanese Patent Application No. 59-243916.

*Primary Examiner*—Thomas C. Lee
*Attorney, Agent, or Firm*—Fitzpatrick, Cella, Harper & Scinto

[57] ABSTRACT

A document processing system for formatting document information in accordance with a format includes a disk apparatus which independently has a document file, an address table file, and a format information file. The document file stores the document information corresponding to predetermined regions. The address table file stores an address table corresponding to the document information. The format information file stores the format information corresponding to the document information. A control circuit, in response to a page designation, controls the three files to correct format information and address information for document information preceding the designated page.

16 Claims, 9 Drawing Sheets

DOCUMENT PROCESSING APPARATUS FOR CORRECTING ADDRESS AND FORMAT INFORMATION OF DOCUMENT INFORMATION UP TO A DESIGNATED PAGE

This application is a continuation of application Ser. No. 07/344,518 filed Apr. 24, 1989, now abandoned, which is a continuation of application Ser. No. 07/935,382 filed Nov. 26, 1986, now abandoned.

BACKGROUND OF THE INVENTION

1. Field of the Invention

The present invention relates to a document processing system for automatically formatting a document according to a format and, more particularly, to a document processing system having start format information in each predetermined region, or to a document processing system capable of smoothly outputting documents with different sheet sizes.

2. Related Background Art

In conventional document processing systems such as word processors, a large amount of document data are processed in a batch manner, and it is impossible to interactively input/edit the document data on a given page.

The reason for this is as follows. When a document is changed by an input/edit operation during formatting of a large amount of the data according to a given format, position data for pagination must be corrected to reset a pagination position so that a given page is displayed immediately. However, since conventional document processing systems do not have all the data in main memories, it takes a long time to read the data out from a disk or the like or to change the data, and it is practically impossible to reset the data whenever it is changed. In addition, when a change in format information such as a line length may be present in a middle of a document, the data must be retrieved from the beginning of the document to check whether such a change is present because a given page cannot be displayed only pagination if such a format change is present.

In addition, when sizes of sheets to be output relating to the format information are different, e.g., A4 for page 1, A3 for page 2, and B4 for page 3, it is difficult to change arrangement of characters on each page. Therefore, the operator must reset the sheet every time each page is output, and it is impossible to automatically output each page with its optimal sheet size as a format.

SUMMARY OF THE INVENTION

The present invention has been made in consideration of the above situation, and has as its object to provide a document processing system having start format information and document data independently in each predetermined region and a page address table for managing the addresses of these regions, thereby allowing free switching of the format information and at the same time interactive inputting/editing of the document data even when the document contains a large amount of the data, and also allowing confirmation of a layout.

The present invention has been made in consideration of the above situation, and has as its object to provide an image processing system having start format information and document data independently in each page, and a page address table for managing the addresses of these pages, thereby allowing free switching of the format information on each page and at the same time, especially in printing, automatic printing and outputting of a page if a sheet of a size preset for the page is set.

It is an object of the present invention to provide a document processing system comprising:
first memory means for storing a large amount of document information,
second memory means for storing format information such as page information of the document information stored in the first memory means,
third memory means for storing address information of the document information and the format information stored in the first and second memory means,
document editing means for editing the document information stored in the first memory means,
page designating means for designating a given page defined by the format information stored in the second memory means,
means for reading out the document information defined by the page designating means stored in the first memory means, and
control means for managing, when the document information is edited by the document editing means, the first, second and third memory means to correct the format information and the address information stored in the first, second and third memory means for the document information preceding the page designated by the page designating means.

DETAILED DESCRIPTION OF THE PREFERRED EMBODIMENTS

An embodiment of the present invention will now be described in detail with reference to the accompanying drawings. Note that a document (sentence) processed in the present invention is not limited to that consisting of character information, but may consist of image information or mixture of both. Also, the present invention may be constituted by a single unit or achieved in a system consisting a plurality of units.

In addition, although not shown, the present invention has an input operation section for inputting various instructions such as an editing or a printing instruction to be described later.

Figure 1:
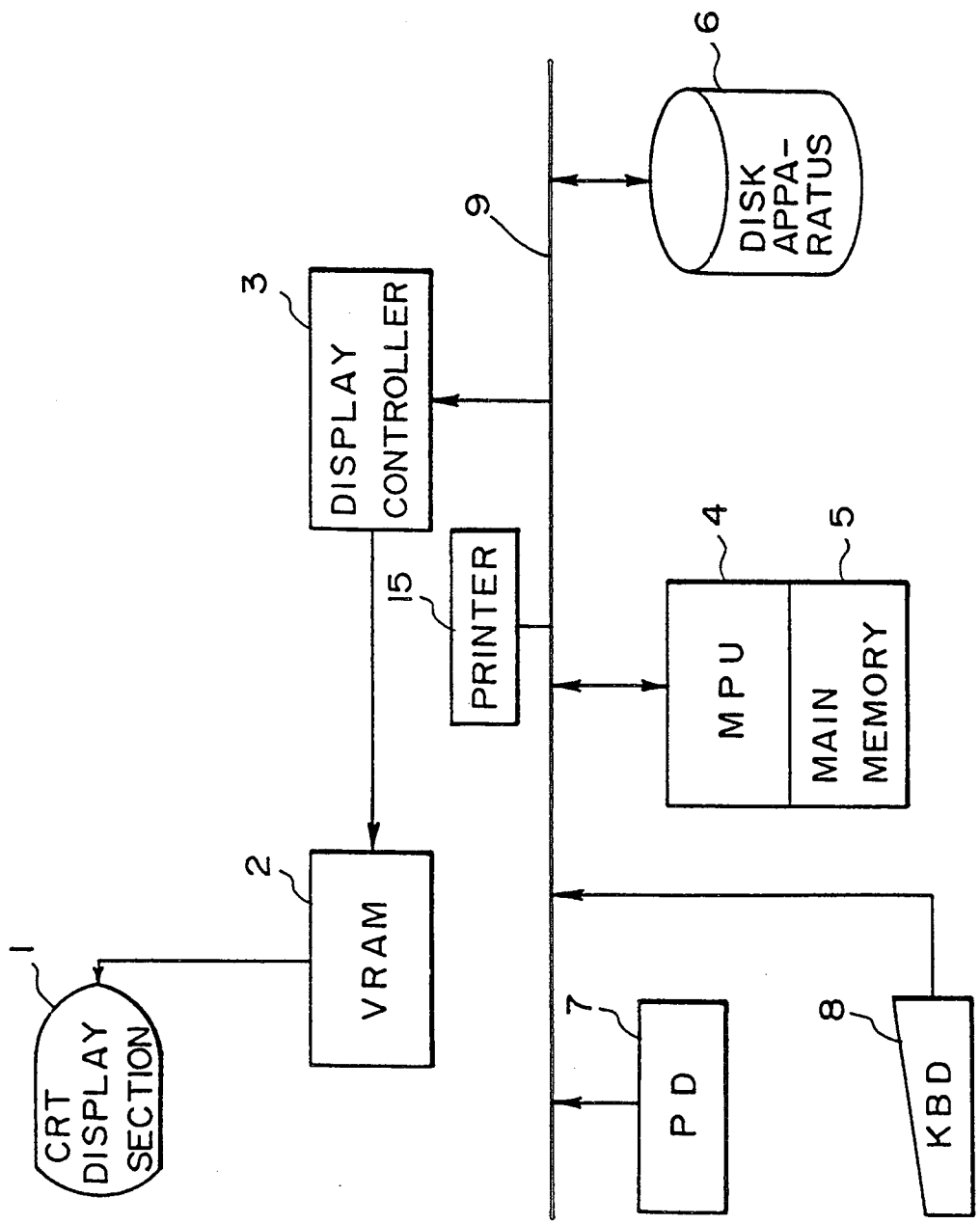
FIG. 1 is a block diagram of a document processing system according to an embodiment of the present invention.

Further, type-setting in the present invention means electronic positioning of the document information on the basis of format information. FIG. 1 is a block diagram of a document processing system according to an embodiment of the present invention. In FIG. 1, the system includes a raster scan display CRT display section 1, a video RAM (VRAM) 2 for storing pattern develop information of one screen, a display controller 3 for performing pattern develop control for the VRAM 2 and pattern read out control for the CRT display section 1, a micro processor (MPU) 4 for forming main control of the system according to the embodiment, a main memory 5 including a ROM incorporating a control program (a flowchart to be described later) and a RAM for data processing, an external magnetic disk apparatus 6 having a document file or the like therein, a pointing device (PD) 7 for performing point designation input of a display screen, a keyboard 8, a printer 15, and an I/O bus 9 for connecting these blocks and the MPU 4.

Figure 2:
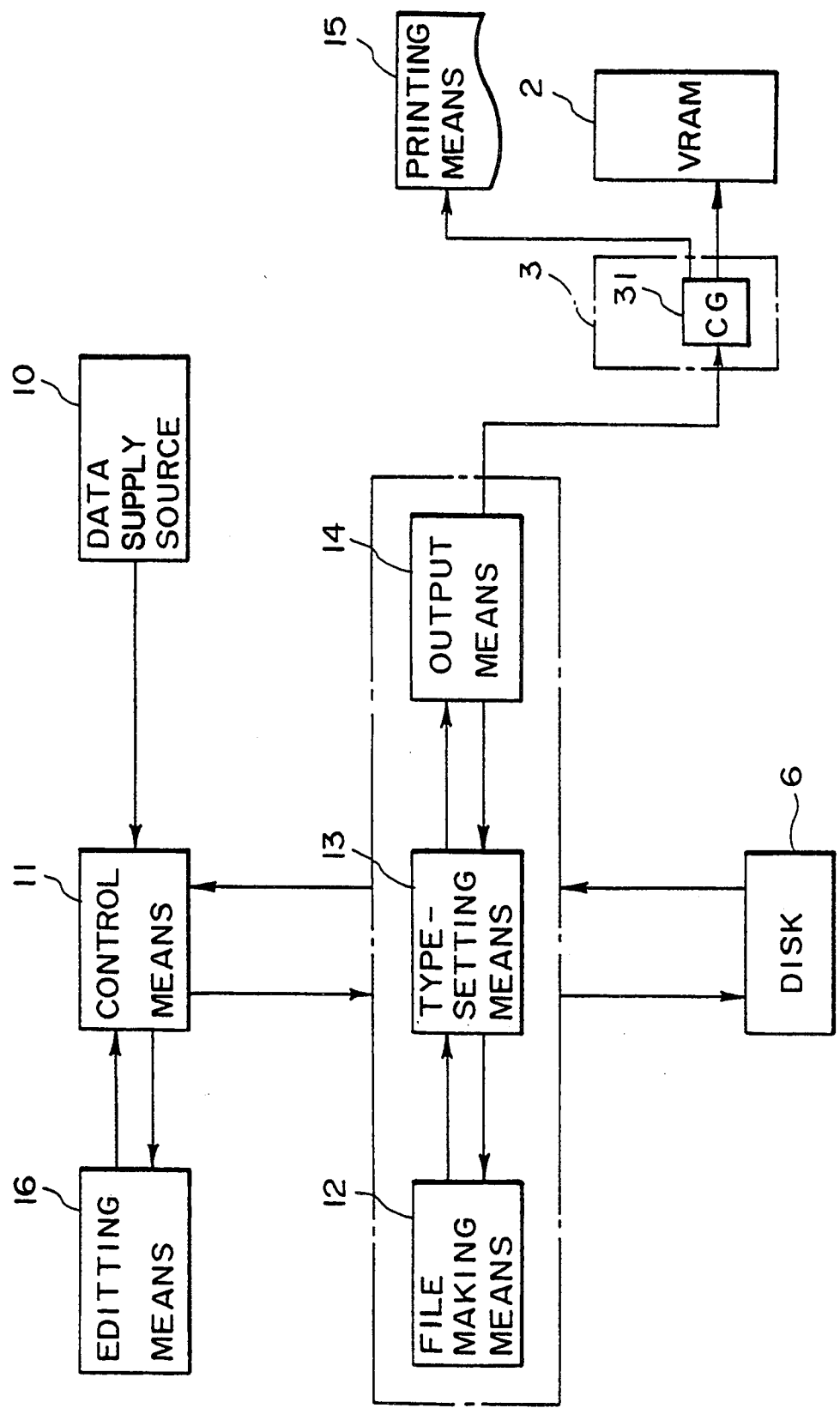
FIG. 2 is a block diagram showing the arrangement of FIG. 1 in units of function.

FIG. 2 is a block diagram showing an arrangement of FIG. 1 in units of function. In FIG. 2, document data from a data supply source 10 is accessed to a disk 6 through a control means 11, and transferred to a file making means 12 for making an address table file, a format information file, and a sentence data file through a type-setting means 13, or to an output means 14 for printing out as printed material or displaying on the CRT through a character generator (CG) 31.

When the document data transferred to the output means 14 is to be displayed on the CRT, the document data is pattern converted by the character generator (CG) 31 and developed in the VRAM 2.

The document data from the data supplying source 10 is edited by an editing means 16 through the control means 11.

A format information file will now be described below. The format information includes sheet size, character size, image region, type style, line pitch, character pitch, page numbering, and the like. When type-setting is executed, such format information may have been changed in a preceding sentence. Therefore, when type-setting is executed for a given page without referring to preceding pages, the format information is required together with a start position of the page. In addition, if a sentence continues from the previous page to a given page, indent processing is not required. However, if a paragraph ends at the end of the previous page, the indent processing is required. Therefore, this information is also required as the format information. Thus, as the automatic type-setting function becomes intricate, the format information increases.

Figure 3:
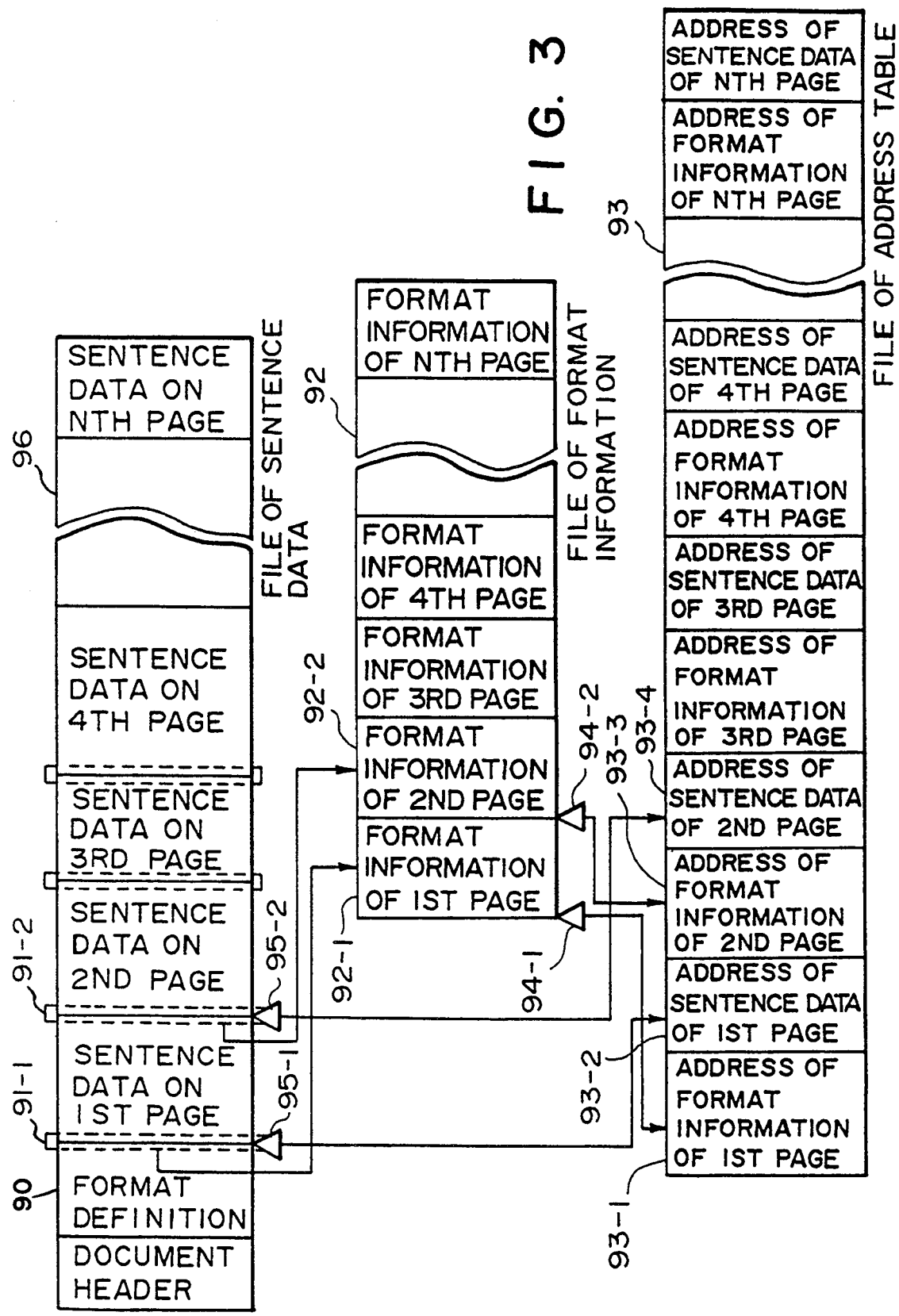
FIG. 3 is a view for explaining a process of making a format information file 92 and an address table file.
Figure 4:
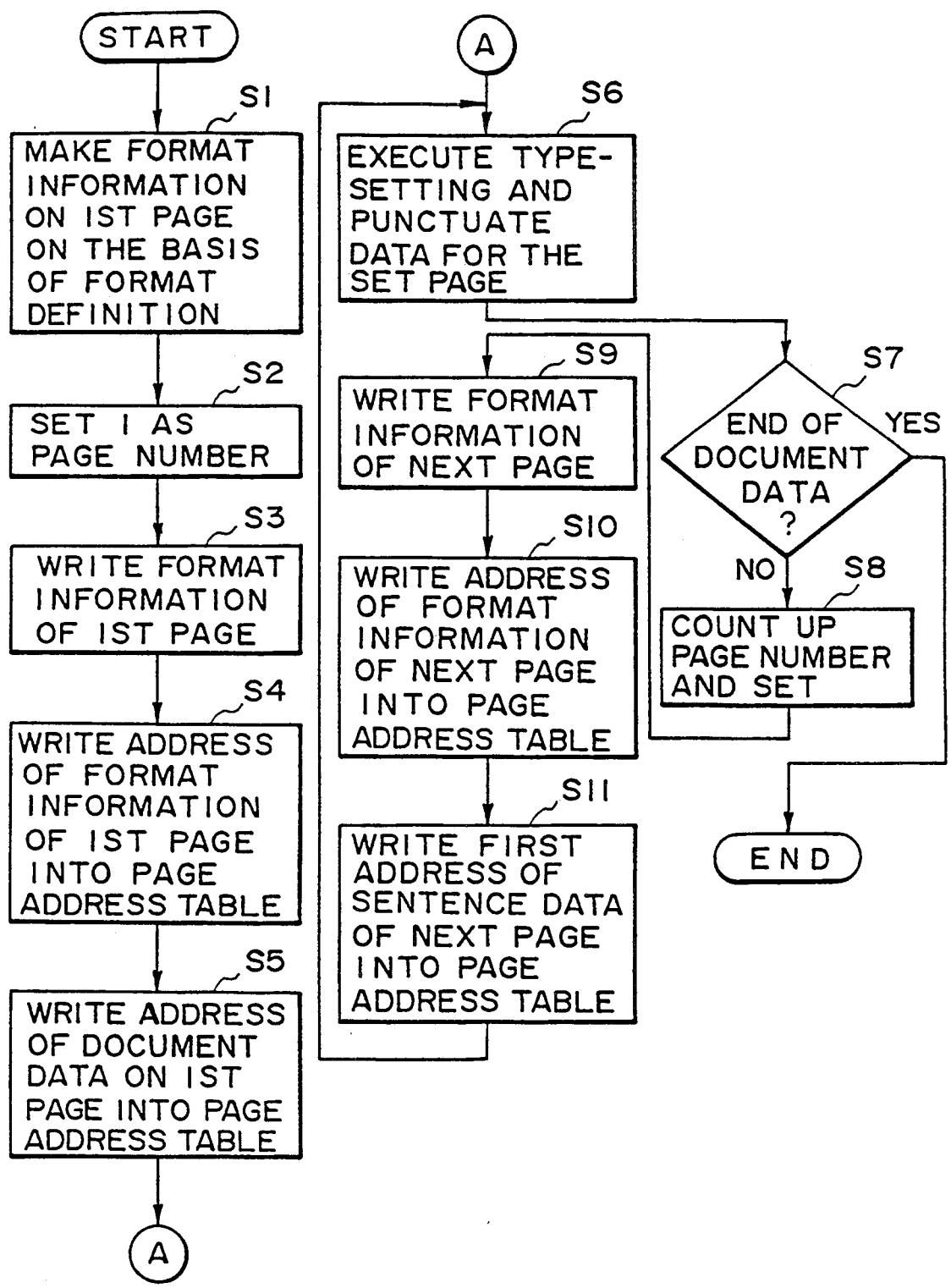
FIG. 4 is a flowchart showing the processing sequence of FIG. 3.

FIG. 3 is a view for explaining in detail the address table file, the format information file, and the sentence data file in the disk apparatus 6 of FIG. 2, and FIG. 4 is a flowchart showing sequences for making them. One document has the address table, the format information, and the sentence data files. The processes for making them will now be described with reference to FIGS. 3 and 4. Note that a character information file and an image information file may be provided in the sentence data file.

First, with respect to the sentence data for which input is finished, the format information of a 1st page (91-1) is made on the basis of a format definition (90) in step S1. Page number "1" is set in step S2. The format information of the 1st page (91-1) is written in a format information file (92-1) in step S3. The address of format information of a 1st page (94-1) is written in an address table file (93-1) in step S4. An address of the sentence data of a 1st page (95-1) is written in an address table file (93-2) in step 5. Thus, 3 files for the 1st page are made. Type-setting is executed for the 1st page and the sentence data is paginated into the length of a page in step S6. Whether the sentence data is ended is determined in step S7, and if NO, the format information of 2nd page (92-2) is made on the basis of the information held by the type-setting means at the end of processing the 1st page. A page number is counted up to "2" and this number is set in step S8. This format information is written in the format information of the 2nd page (92-2) in step S9. An address of the format information of the 2nd page (94-2) is written in an address table (93-3) in step S10. An address of the sentence data of the 2nd page (95-2) is written in an address table (93-4) in step S11. Thus, 3 files for the 2nd page are completed.

The above-mentioned operations are repeated to the end of the document data. At the end of the document data, an address table file 93, a format information file 92, and a sentence data file 96 are completed.

Figure 5:
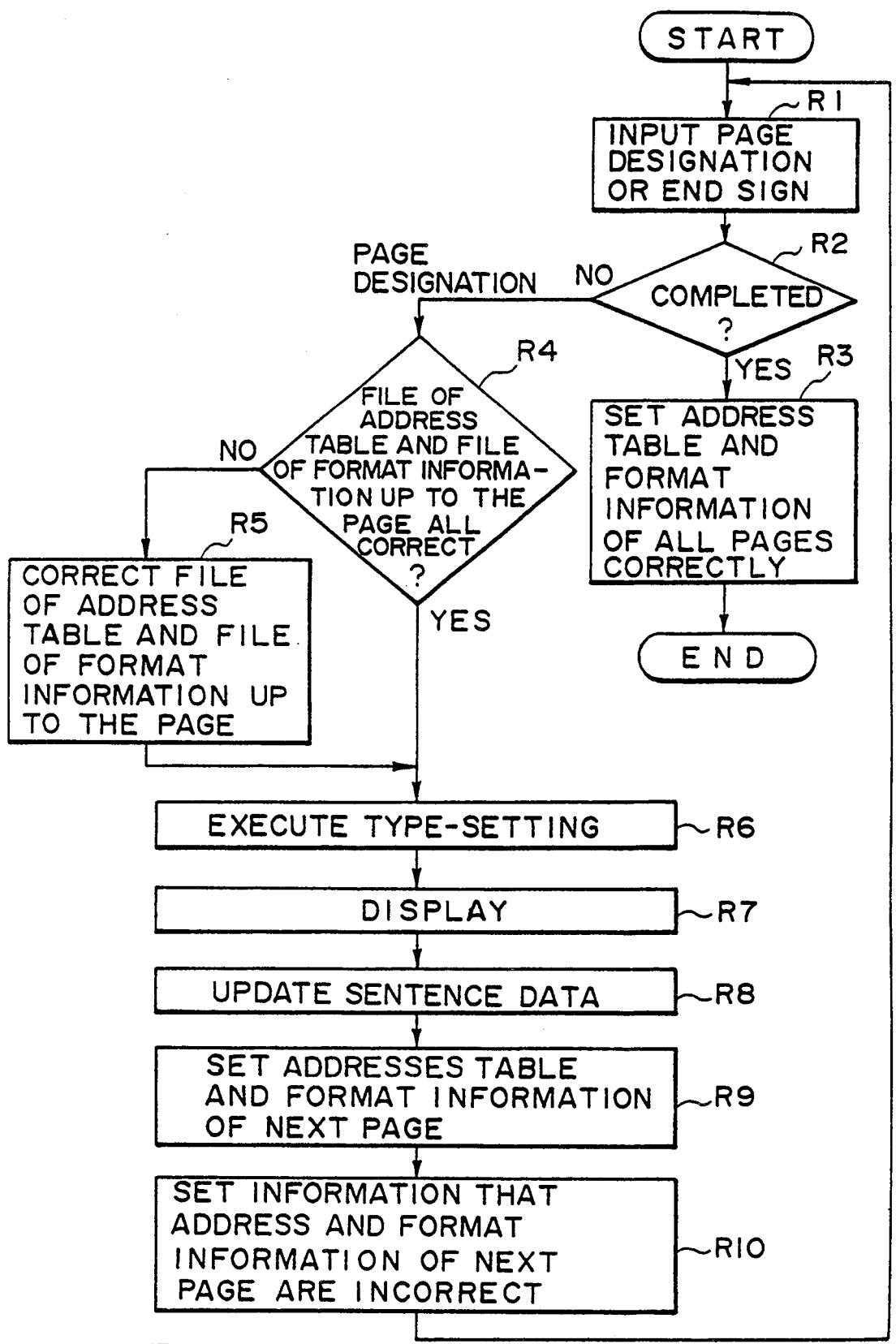
FIG. 5 is a flowchart for updating sentence data for a certain page.

FIG. 5 is a flowchart for updating the sentence data of a certain page. A page designation instruction for designating a certain page in a large amount of the document data or an instruction for completing document input is awaited in step R1. Whether document input is completed is determined in step R2. If YES in step R2, address tables and the format information of all pages are correctly set in step R3 by the same processing as that in FIG. 4, and the flow is ended. If NO in step R2, i.e., page designation is instructed, address tables and the format information up to the input page in step R4 are determined. As described above, the address table and the format information are correctly set in the document file immediately after the address table file and the format information file are made. However, they may not be correct if the document data is updated as will be described later. If they are not correct, this determination is performed by a flag to be described later. Then, address table files and the format information up to the designated page are correctly set in step R5. This can be achieved in the same manner as that in making files described above. Thereafter, type-setting is executed to decide each character position by the format or the like in step R6. A condition of typesetting of the page is displayed in step R7. The sentence data of the page is updated in step R8.

When the sentence data is updated, an address table and the format information of the next page are set from the information at the end of type-setting of the page in step R9. At this time., the information of the following pages is not reset, and a flag (or a code) for indicating "incorrect" is set in step R10. This is because it takes a long time to execute retype-setting to the end of a large amount of the document every time the document data is changed, so that input/edit or layout of interactive sentence data cannot be confirmed.

Note that in steps R3 and R5 of FIG. 5, if necessary format information is present, the number of pages for which retype-setting is to be executed can be reduced since when retype-setting is executed for a certain page, it can be determined whether the following pages are affected. Therefore, response characteristics can be further improved when the sentence data is updated. The above operation may also be performed utilizing wait time.

In step R5 of FIG. 5, address table files and format information files up to the designated page are corrected. However, the format information and the document data of the edited or changed pages may be stored in an intermediate file (not shown). An address table determines whether the intermediate file or the above-mentioned file stores the format information and document data of the changed pages. The address table file and the format information file may be corrected on the bases of the information from the intermediate file to create the file shown in FIG. 3 in step R5.

Figure 6:
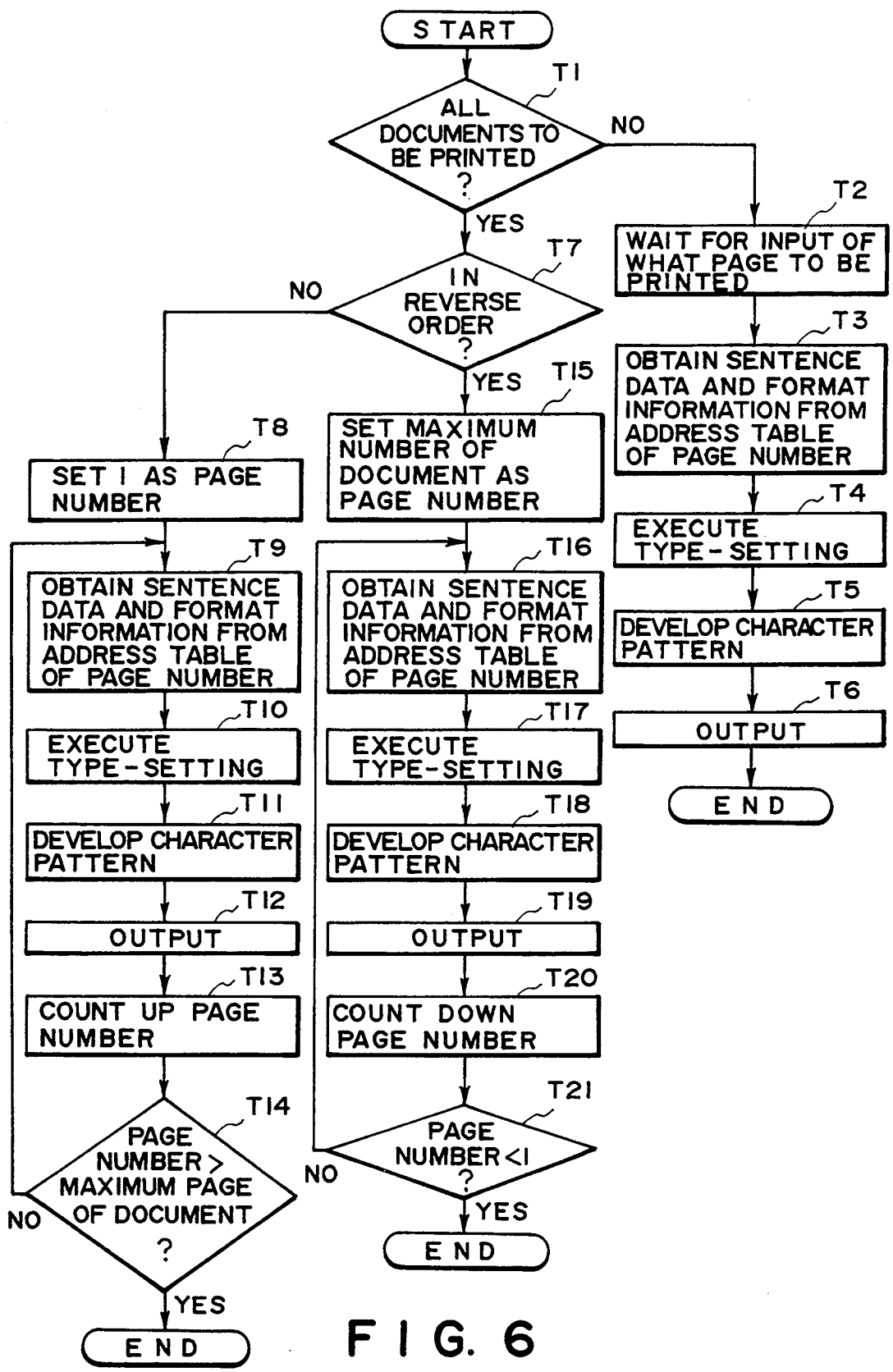
FIG. 6 is a flowchart showing the processing sequence of the embodiment.

FIG. 6 is a flowchart showing, when the address table file 93, the format information file 92, and the sentence data file 96 described above are made, a sequence for printing some or all of the documents in the reverse order of a normal printing sequence.

First, printing of some of the documents will be described below. Whether all of the documents are to be printed is determined in step T1. In this case, since some of the documents are to be printed, an instruction for page numbers to be printed is awaited in step T2. In this step, data of page numbers is read out from the data supplying source 10. The format information address and the sentence data address of the pages of the address table file 93 are obtained in step T3. Type-setting is executed by the type-setting means in step T4. The character pattern is developed with this data by the output means 14 and the CG 31 in step T5. Data is transferred to the printing means 15 and output in step T6. Thus, printing is completed.

Then, the latter, i.e., printing of all the documents in the normal order will be described below. Whether all the documents are to be printed is determined in step T1. In this case, since all the documents are to be printed, the printing order is determined in step T7. In this case, since printing is executed in the normal order, "1" is set as a page number in step T8. The format information address and the sentence data address of the 1st page of the address table file 93 are obtained in step T9. Type-setting is executed in step T10. This data is transferred to steps T11 and T12 and is output. Then, the page number is counted up in step T13. Whether the above page number is larger than a maximum page is determined in step T14. If NO in step T14, the sequence returns to step T9 and the above operation is repeated, If YES in step T14, printing is completed.

Then, printing of all the documents in the reverse order will be described below. Whether all the documents are to be printed is determined in step T1. In this case, since all the documents are to be printed, the printing order is determined in step T7. In this case, since printing is executed in the reverse order, maximum number n is set as the page number. The format information address and the sentence data address of the nth page of the address table file 93 are obtained in step T16. Type-setting is executed in step T17. This data is transferred to steps T18 and T19 and is output. Then, the page number is counted down in step T20. Whether the page number is smaller than 1 is determined in step T21. If NO in step T21, the sequence returns to step T16, and the above operation is repeated. If YES in step T21, printing is completed.

Although the above embodiment is described with reference to a document processing system, the present invention may be applied to a document processing system (disclosed in Japanese Patent Application No. 59-243916) or a part thereof including a work station, digital computer, or the like.

As has been described above, according to the present invention, display or input/edit of a given page of a large amount of documents can be easily executed at high speed, the document data can be interactively input/edit, and layout can be confirmed. In addition, printing of a given page or printing in the reverse order can be easily executed at high speed. Further, the format information can be freely changed in a middle of the sentence.

As is apparent from the above description, a document processing system having high operability can be provided.

Figure 7A:
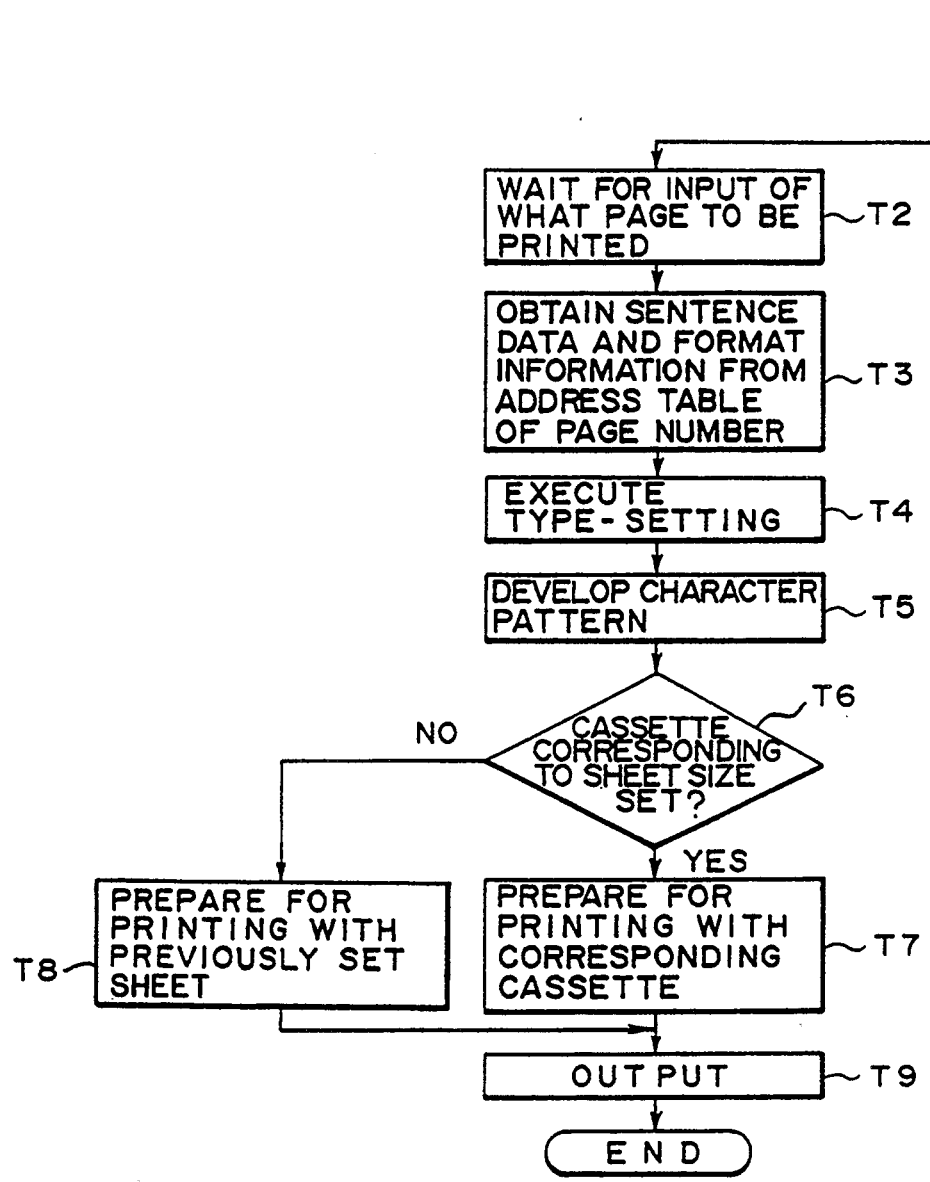
FIG. 7 composed of FIGS. 7A, 7B and 7C is a flowchart showing the processing sequence of the embodiment.
Figure 7:
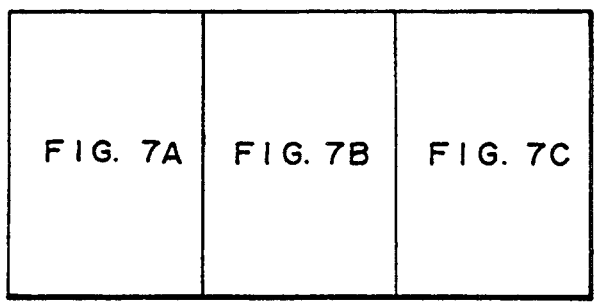
Figure 7B:
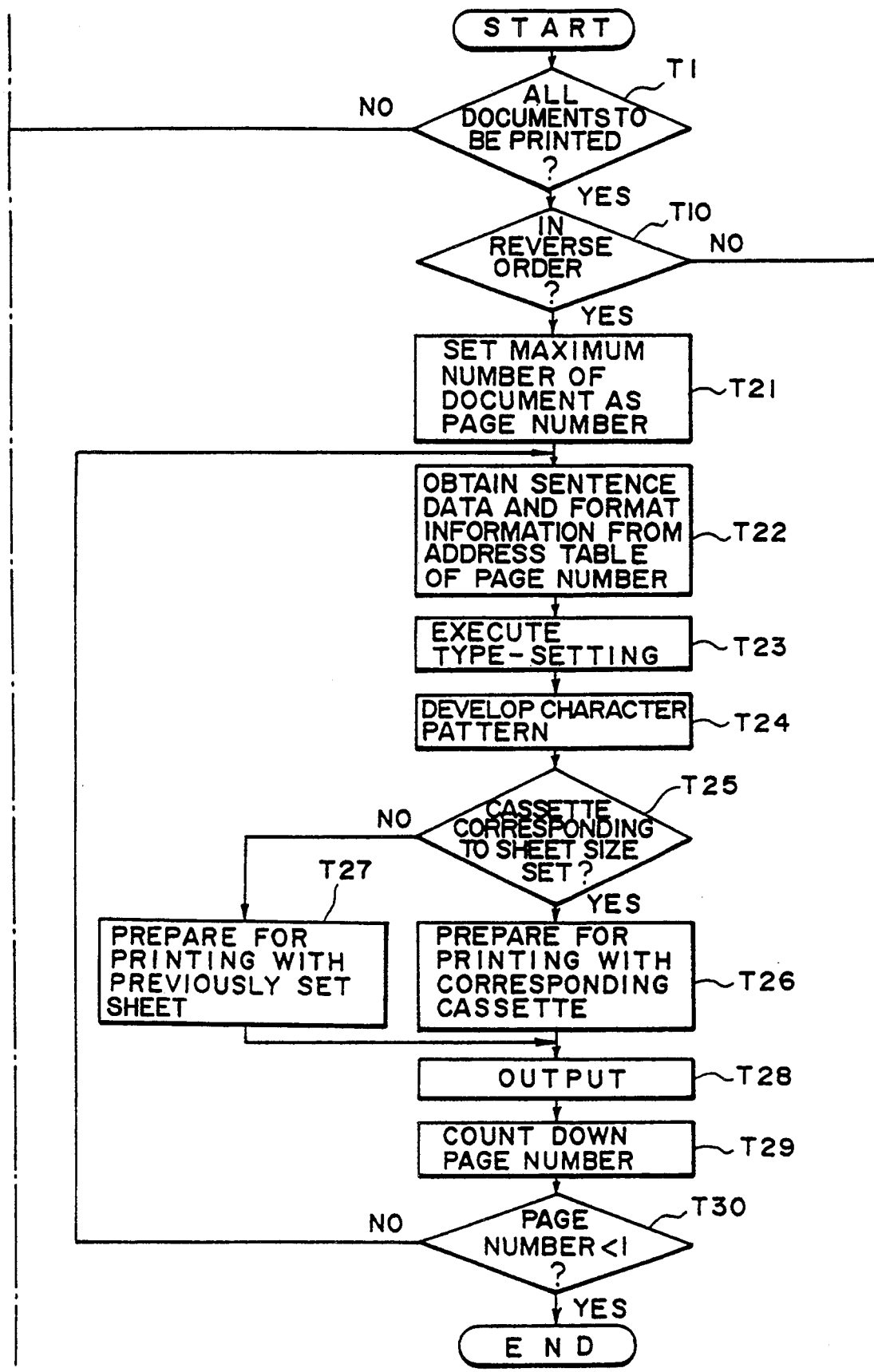
Figure 7C:
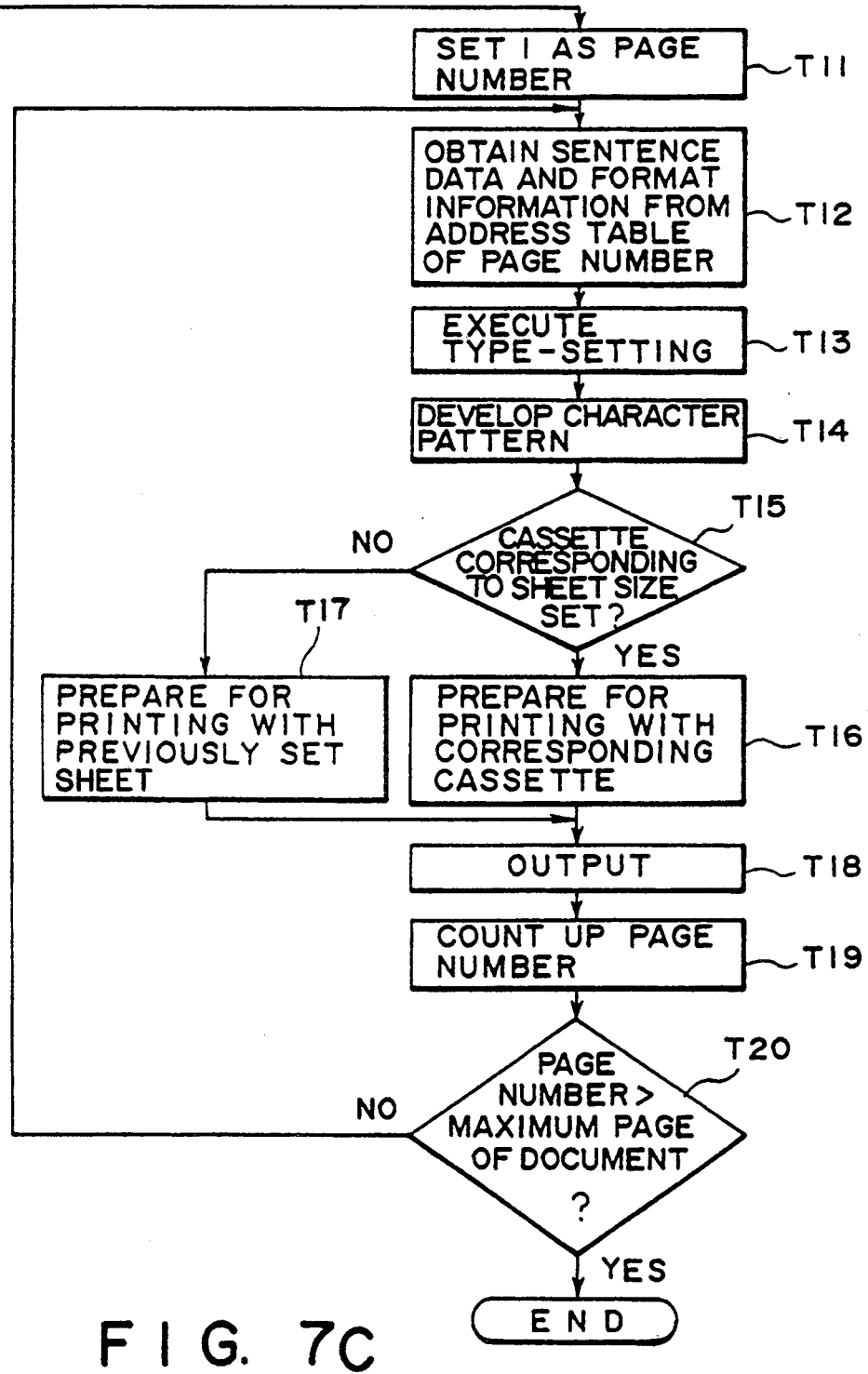

FIG. 7 is a flowchart showing, when the address table file 93, the format information file 92, and the sentence data file 96 are made, the same sequence as described above except that output size is variable for each page and some or all of the documents are printed in the reverse order of the normal one. Note that a printer in this case is, e.g., a laser beam printer capable of selectively switching sheets of a plurality of output sizes and printing on sheets of selected sizes.

First, printing of some of the documents will be described below. Whether all the documents are to be printed is determined in step T1. In this case, since some of the documents are to be printed, instruction for a page to be printed is awaited in step T2. In this step, data of the page to be printed is read out from the data supplying source 10. The format information address of the sentence data address of the page of the address table file 93 is obtained in step T3. Type-setting is executed by the type-setting means 13 in step T4. The character pattern is developed with this data by the output means 14 and the CG 31 in step T5 and transferred to the printing means 15. A sheet size of the page is determined from the format information, and whether a sheet cassette of the sheet size is set is determined in step T6. The document is output in step T9 on the sheet set in step T7 if the cassette corresponding to the sheet size is set, or on the sheet already set in step T8 if the cassette corresponding to the sheet size is not set. Thus, the sequence is completed in step T9.

Then, the latter, i.e., printing of all the documents in the normal order will be described. Whether all the documents are to be printed is determined in step T1. In this case, since all the documents are to be printed, the printing order is determined in step T10. In this case, since printing is executed in the normal order, "1" is set as the page number in step T11. The format information address and the sentence data address of the 1st page of the address table file 93 are obtained in step T12. Type-setting is executed in step T13. This data is developed in step T14 and transferred to the printing means 15. A sheet size of the page is determined from the format information, and whether the sheet cassette of the size is set is determined in step T15. The document is output in step T18 on the sheet set in step T16 if the cassette of the sheet size corresponding to the page is set, or on the sheet already set in step T17 if the cassette of the sheet size corresponding to the page is not set. Then, the page number is counted up in step T19. Whether the page number is larger than the maximum page is determined in step T20. If NO in step T20, the sequence returns to step T12 and the above operation is repeated. If YES in step T20, the printing is completed.

Then, printing of all the documents in the reverse order will be described below. Whether all the documents are to be printed is determined in step T1. In this case, since all the documents are to be printed, the printing order is determined in step T10. In this case, since printing is executed in the reverse order, maximum number n is set as the page number in step T21. The format information address and the sentence data address of the nth page of the address table file 93 are obtained in step T22. Type-setting is executed in step T23. This data is developed in step T24 and transferred to the printing means 15. A sheet size of the page is determined from the format information, and whether a sheet cassette of the sheet size is set is determined in step T25. Data is output in step T28 on the sheet set in step T26 if the cassette of the sheet size corresponding to the page is set, or on the sheet preset in step T27 if the cassette of the sheet size corresponding to the page is not set. Then, the page number is counted down in step T29. Whether the page number is smaller than 1 is determined in step T30. If NO in step T30, the sequence returns to step T22, and the above operation is repeated. If YES in step T30, printing is completed.

In this embodiment, a description has been made with reference to the case in which the format information has sheet size information. However, the present invention is not limited to the above embodiment but includes the case in which the sheet size is changed in a middle of the document by a command even when the format information is not included.

As has been described above, according to the present invention, there is provided an image processing system in which display, input/edit, or printing can be performed at high speed, a page can be smoothly output on a sheet corresponding to a sheet size of the page without a special instruction.

We claim:

1. A document processing system comprising:
   first memory means for storing document information comprising characters;
   second memory means for storing format information of the document information stored in said first memory means;
   third memory means for storing address information of the document information and the format information stored in said first and second memory means, respectively, said third memory means storing the address information together in at least one page unit;
   page designating means for designating a given page comprising at least part of the document information stored in said first memory means whose format is defined by the format information stored in said second memory means;
   means for reading out the document information of the given page designated by said page designating means stored in said first memory means; and
   control means for controlling, in response to the page designation by said page designating means, said first, second, and third memory means, and type-setting means and correcting means such that the address and format information of the document information and the document information up to the designated page is corrected by the correcting means and type-setting is executed by the type-setting means for the document information read out by said reading means,
   wherein said control means controls said first, second, and third memory means such that type-setting is executed electronically by said type-setting means for the document information read out by said reading means.

2. A system according to claim 1, further comprising means for determining, based upon the format information, whether the document information is edited in units of pages.

3. A system according to claim 1, wherein said third memory means stores address information on an address of predetermined regions of the document information and stores address information on an address of the format information corresponding to the document information in said predetermined regions.

4. A system according to claim 3, wherein the predetermined regions are in units of pages of the document information subjected to formatting.

5. A system according to claim 4, wherein said second memory means stores information as to an output size of the document information up to, including, and after the designated page, wherein said system further comprises output means for outputting on output sheets the document information in units of pages, and control means for selecting sizes of the output sheets on the basis of the output size information stores in said second memory means.

6. A system according to claim 1, wherein said second memory means stores information as to an output size of the document information up to the designated page, for the designated page, and after the designated page, wherein said system further comprises output means for outputting on output sheets the document information in units of pages, and output control means for selecting sizes of the output sheets on the basis of the output size information stores in said second memory means.

7. A document processing system comprising:
   first memory means for storing document information comprising a plurality of characters;
   second memory means for storing format information of the document information stored in said first memory means;
   third memory means for storing address information of the document information and the format information stored in said first and second memory means, respectively, said third memory means storing the address information together in at least one page unit;
   indicating means for indicating an end of inputting of the characters of the document information stored in said first memory means into the system; and
   control means for controlling said second and third memory means and correcting means to correct the format information and address information in response to the indicating by said indicating means,
   wherein said control means controls said second and third memory means and type-setting means such that type-setting is executed by the type-setting means electronically for the document information read out of said first memory means by reading means.

8. A document processing system comprising:
   first memory means for storing document information comprising a plurality of pages of document information of a plurality of characters;
   second memory means for storing format information of the document information stored in said first memory means;
   third memory means for storing address information of the document information and the format information stored in said first and second memory means, respectively, said third memory means storing the address information together in at least one page unit;
   determining means for determining whether a given instruction is for ending input of characters into said system to be stored as document information in said first memory means or for designating a page of the document information stored in said first memory means; and control means for controlling said second and third memory means and correcting means to correct the format information and address information when said determining means determines that the given instruction is for ending input of characters into said system, and for controlling type-setting means and said first, second, and third memory means so that type-setting is executed electronically by the type-setting means for the document information read out of said first memory means by reading means on the basis of the format information and the address information up to a page determined by the given instruction to be a designated page when said determining means determines that the given instruction is for designating a page.

9. A method of reading out document information comprising a plurality of pages comprising characters stored in a first memory, format information of the document information being stored in a second memory, and address information of the document information and the format information being stored in a third memory, said third memory storing the address information together in at least one page unit, comprising the steps of:

designating a given page comprising a document information in the first memory whose format is defined by the format information stored in said second memory;

reading out the information of the given page designated in said designating step and stored in said first memory; and controlling, in response to the designating performed in said designating step, the first, second, and third memories and type-setting means and correcting means such that the document information and the format information and the address information of the document information up to the designated given page is corrected by the correcting means and type-set by the type-setting means electronically for the document information read out in said reading step.

10. The method according to claim 9, further comprising the step of determining whether the document information is edited in units of pages based on the stored format information.

11. The method according to claim 9, further comprising the steps of storing address information on an address of predetermined regions of the document information, and storing address information of an address of the format information corresponding to the document information in the predetermined regions.

12. The method according to claim 11, wherein said step of storing address information on an address of predetermined regions of the document information comprises the step of storing address information on an address of predetermined regions in units of at least one page of the document information.

13. The method according to claim 12, further comprising the steps of storing information as to an output size of the document information up to, including, and after the designated page in the second memory means, outputting on output sheets the document information in units of pages, and selecting sizes of the output sheets on the basis of the output size information stored in the second memory means.

14. The method according to claim 9, further comprising the steps of storing information as to an output size of the document information up to, including, and after the designated page in the second memory means, outputting on output sheets the document information in units of pages, and selecting sizes of the output sheets on the basis of the output size information stored in the second memory means.

15. A method for processing document information comprising a plurality of characters stored in a first memory, format information of the document information being stored in a second memory, and address information of the document information and the format information being stored in a third memory, said third memory storing the address information together in at least one page unit, comprising the steps of:

indicating an end of inputting of the characters of the document information into the first memory;

controlling the second and third memories to correct the format information and the address information in response to the indicating performed in said indicating step;

reading out the document information stored in the first memory; and controlling the first, second, and third memories and type-setting means such that type-setting is executed electronically by the type-setting means for the document information read out in said reading step.

16. A method for storing document information comprising a plurality of pages comprising characters stored in a first memory, format information of the document information being stored in a second memory, and address information of the document information and the format information being stored in a third memory, said third memory storing the address information together in at least one page unit, comprising the steps of:

determining whether a given instruction is for ending input of characters of the document information into the first memory or for designating a page of the document information stored in the first memory; and controlling the second and third memories to correct the format information and the address information of the document information when said determining step determines that the given instruction is for ending input of characters of the document information into the first memory, and controlling the first, second and third memories and type-setting means so that type-setting is electronically executed by the type-setting means for the document information on the basis of the format information and the address information up to a page designated by the given instruction when said determining step determines that the given instruction is for designating a page.

* * * * *

UNITED STATES PATENT AND TRADEMARK OFFICE
CERTIFICATE OF CORRECTION

PATENT NO. : 5,353,222
DATED : October 4, 1994
INVENTOR(S) : KIKUO TAKISE, ET AL.

It is certified that error appears in the above-indentified patent and that said Letters Patent is hereby corrected as shown below:

ON THE COVER PAGE

[56] References Cited

FOREIGN PATENT DOCUMENTS

"121165 6/1986 Japan" should read --61-121161 6/1986 Japan--.

ON SHEET 2 OF THE DRAWINGS

Figure 2

In Box 16, "EDITTING" should read --EDITING--.

COLUMN 1

Line 42, "only pagination" should be deleted.

COLUMN 4

Line 46, "time.," should read --time,--.

COLUMN 5

Line 3, "bases" should read --basis--.
Line 38, "repeated," should read --repeated.--.

UNITED STATES PATENT AND TRADEMARK OFFICE
CERTIFICATE OF CORRECTION

PATENT NO. : 5,353,222

DATED : October 4, 1994

INVENTOR(S) : KIKUO TAKISE, ET AL.

It is certified that error appears in the above-indentified patent and that said Letters Patent is hereby corrected as shown below:

COLUMN 8

Line 5, "of pages" should read --of at least one page--.
Line 6, "subjected to formatting" should be deleted.
Line 14, "stores" should read --stored--.
Line 24, "stores" should read --stored--.

COLUMN 10

Line 3, "pages,and" should read --pages, and--.
Line 11, "pages,and" should read --pages, and--.

Signed and Sealed this

Twenty-first Day of November, 1995

Attest:

BRUCE LEHMAN

Attesting Officer    Commissioner of Patents and Trademarks